United States Patent
Ning et al.

(10) Patent No.: US 10,402,561 B2
(45) Date of Patent: Sep. 3, 2019

(54) APPARATUS AND METHOD FOR PROTECTION OF CRITICAL EMBEDDED SYSTEM COMPONENTS VIA HARDWARE-ISOLATED SECURE ELEMENT-BASED MONITOR

(71) Applicant: Samsung Electronics Co., Ltd., Suwon-si, Gyeonggi-do (KR)

(72) Inventors: Peng Ning, Mountain View, CA (US); Stephen E. McLaughlin, Mountain View, CA (US); Michael C Grace, Mountain View, CA (US); Ahmed M Azab, Mountain View, CA (US); Rohan Bhutkar, Mountain View, CA (US); Wenbo Shen, Mountain View, CA (US); Xun Chen, Mountain View, CA (US); Yong Choi, Mountain View, CA (US); Ken Chen, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 15/048,534

(22) Filed: Feb. 19, 2016

(65) Prior Publication Data

US 2017/0098070 A1    Apr. 6, 2017

Related U.S. Application Data

(60) Provisional application No. 62/235,964, filed on Oct. 1, 2015.

(51) Int. Cl.
*G06F 21/57* (2013.01)
*G06F 21/51* (2013.01)
(Continued)

(52) U.S. Cl.
CPC .............. *G06F 21/51* (2013.01); *G06F 21/57* (2013.01); *G06F 21/602* (2013.01); *G06F 21/85* (2013.01);
(Continued)

(58) Field of Classification Search
None
See application file for complete search history.

(56) References Cited

U.S. PATENT DOCUMENTS

| 2004/0117106 | A1* | 6/2004 | Dudel | B60R 25/04 701/115 |
| 2005/0256614 | A1* | 11/2005 | Habermas | G06F 8/65 701/1 |

(Continued)

*Primary Examiner* — Malcolm Cribbs
(74) *Attorney, Agent, or Firm* — Jefferson IP Law, LLP (57) ABSTRACT

An apparatus and method of a hardware isolated secure element protecting a plurality of mission critical subsystems are provided. The method includes performing an actuation operation received across an unsecure path that modifies the state of a mission critical subsystem, performing a diagnostic operation received across the unsecure path that requests state information of the mission critical subsystem, storing information used to determine which of the diagnostic operation and the actuation operation received across the unsecure path are performed, and flashing an execution image of an electronic control unit when the execution image of the electronic control unit is received across the unsecure path.

18 Claims, 10 Drawing Sheets

(51) Int. Cl.
*G06F 21/60* (2013.01)
*G06F 21/85* (2013.01)
*G07C 5/08* (2006.01)
*G06F 21/64* (2013.01)

(52) U.S. Cl.
CPC ............ *G07C 5/0808* (2013.01); *G06F 21/64* (2013.01); *G06F 2221/034* (2013.01)

(56) References Cited

U.S. PATENT DOCUMENTS

| | | | |
|---|---|---|---|
| 2006/0235580 A1* | 10/2006 | Weiss | B60R 16/02 |
| | | | 701/2 |
| 2006/0248172 A1* | 11/2006 | Zurawka | G06F 8/665 |
| | | | 709/220 |
| 2007/0028115 A1* | 2/2007 | Kober | G06F 21/572 |
| | | | 713/180 |
| 2007/0180225 A1 | 8/2007 | Schmidt | |
| 2007/0261112 A1 | 11/2007 | Todd et al. | |
| 2012/0060030 A1 | 3/2012 | Lamb | |
| 2014/0032800 A1* | 1/2014 | Peirce | H04L 67/12 |
| | | | 710/105 |
| 2014/0075197 A1* | 3/2014 | Alrabady | G06F 8/65 |
| | | | 713/176 |
| 2015/0089236 A1* | 3/2015 | Han | H04L 9/3242 |
| | | | 713/181 |
| 2015/0229654 A1 | 8/2015 | Perier | |
| 2015/0261521 A1 | 9/2015 | Choi et al. | |
| 2016/0021127 A1* | 1/2016 | Yan | G06F 21/554 |
| | | | 726/23 |

\* cited by examiner

APPARATUS AND METHOD FOR PROTECTION OF CRITICAL EMBEDDED SYSTEM COMPONENTS VIA HARDWARE-ISOLATED SECURE ELEMENT-BASED MONITOR

CROSS-REFERENCE TO RELATED APPLICATION(S)

This application claims the benefit under 35 U.S.C. § 119(e) of a U.S. Provisional application filed on Oct. 1, 2015 in the U.S. Patent and Trademark Office and assigned Ser. No. 62/235,964, the entire disclosure of which is hereby incorporated by reference.

TECHNICAL FIELD

The present disclosure relates to an apparatus and method for securing a state and contents of mission critical subsystems. More particularly, the present disclosure relates to an apparatus and method for securing the state and the contents of mission critical subsystems by isolating the mission critical subsystems behind a hardware based secure element.

BACKGROUND

An Internet of things provides a network of physical objects, devices, vehicles, buildings and other items which are embedded with electronics, software, sensors, and network connectivity. The network connectivity enables these objects to collect and exchange data. The Internet of things allows objects to be sensed and controlled remotely across existing network infrastructure, creating opportunities for more direct integration of a physical world into computer-based systems, and resulting in improved efficiency, accuracy and economic benefit.

However, the devices connected to the Internet of things are vulnerable to attack if firewalls protecting the devices are hacked. While the firewall may not be vulnerable, a Trojan Horse may open up a hole that allows a malicious user to cause havoc in the connected devices. Additionally, software monitors which monitor internal functions of the devices.

For example, a smart home is part of the Internet of things and may include a plurality of appliances, sensors and utility controls that provide data and receive commands to change a state of the device. Further, an On-Board Diagnostic (OBD)-II system is a part of every vehicle manufactured since Jan. 1, 1996. Bluetooth and cellular connectivity via an attachment device allow diagnostic and performance data to be retrieved and commands that affect the performance of the vehicle to be transmitted. And of these device having been hacked could cause damage to the device, or an environment in which the device is located.

Accordingly, there is a need for an apparatus and method for providing a secure element that is interposed between critical, trusted, embedded components of the devices and untrusted components or any untrusted network.

SUMMARY

Aspects of the present disclosure are to address at least the above-mentioned problems and/or disadvantages and to provide at least the advantages described below. Accordingly, an aspect of the present disclosure is to provide an apparatus and method for a secure element for providing hardware isolation of a plurality of mission critical subsystems.

In accordance with an aspect of the present disclosure, a secure element for providing hardware isolation of a mission critical subsystem is provided. The secure element includes a memory and a processor coupled to the memory and an unsecure path configured to perform an actuation operation received across an unsecure path that modifies the state of the mission critical subsystem, perform a diagnostic operation received across the unsecure path that request state information of the mission critical subsystem, store information used to determine which of the diagnostic operation and the actuation operation received across the unsecure path are performed, and flash an execution image of an electronic control unit when the execution image of the electronic control unit is received across the unsecure path. The secure element is coupled to the electronic control unit In accordance with another aspect of the present disclosure, a method in a hardware isolated secure element for protecting a mission critical subsystem is provided. The method includes performing an actuation operation received across an unsecure path that modifies a state of the mission critical subsystems, performing a diagnostic operation received across the unsecure path that requests state information of the mission critical subsystem, storing information used to determine which of the diagnostic operation and the actuation operation received across the unsecure path are performed, and flashing an execution image of an electronic control unit when the execution image of the electronic control unit is received across the unsecure path.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Versatile Disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for providing hardware isolation of a plurality of mission critical subsystems.

Figure 1:
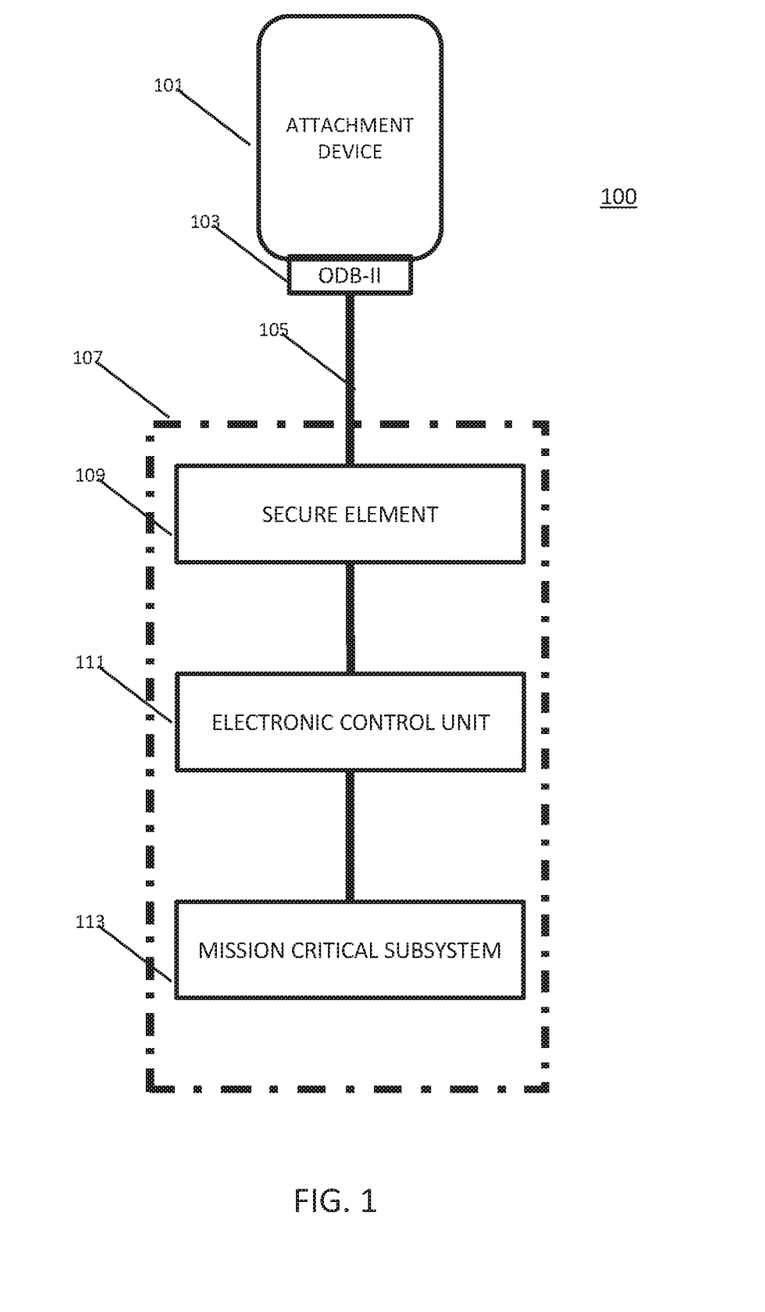
FIG. 1 illustrates a diagram of an architecture of a system with a secure element according to various embodiments of the present disclosure.

FIG. 1 illustrates a diagram of an architecture of a system with a secure element according to various embodiments of the present disclosure.

Referring to FIG. 1, a trusted system 100 with untrusted components including an attachment device 101, an On-Board Diagnostic (OBD)-II port 103 for attaching the attachment device 101 to an OBD II system 107 via an (insecure bus 105 is illustrated. For purposes of the discussion herein, the attachment device 101 is considered an untrusted component.

The unsecure bus 105 may be a controller area network (CAN bus), which is a vehicle bus standard designed to allow microcontrollers and devices to communicate with each other in applications without a host computer. It is a message-based protocol, designed originally for multiplex electrical wiring within automobiles, but is also used in many other contexts.

The electronic control unit 111 controls the mission critical subsystem 113, such as, an electronic engine control module (ECM), a power train control module (PCM), a transmission control module (TCM), a brake control module (BCM), a central control module (CCM), a central timing module (CTM), a general electric module (GEM), a body control module (BCM), and a suspension control module (SCM) of the vehicle, but is not limited thereto.

The secure element 109 is interposed between the unsecure bus 105 and the electronic control unit 111 and the mission critical subsystem 113 in order to protect the electronic control unit 111 and the mission critical subsystem 113 from malicious operations. The secure element 109 protects the electronic control unit 111 and the mission critical subsystem 113 by: (i) enforcing a whitelist of allowed operations or a blacklist of forbidden operations to prevent the untrusted components (e.g., the attachment device 101) from using the critical components (e.g., the electronic control unit 111) for malicious purposes; (ii) blocking attempts to fuzz (test with random data) or otherwise reverse engineer the critical components the mission critical subsystem 113) via communication from a untrusted component (e.g., the attachment device 101); and (iii) measuring code loaded onto critical components (e.g., the electronic control unit 111) by untrusted components (e.g., the attachment device 101). This is often needed when an untrusted CPU (not shown) loads code onto the electronic control unit 111 at system boot time.

The secure element 109 is an isolated piece of hardware that only runs the software/logic dedicated to the functionality described below. Even more qualitative, the secure element 109 is generally the most "security hardened" software and hardware in an embedded system.

Figure 2A:
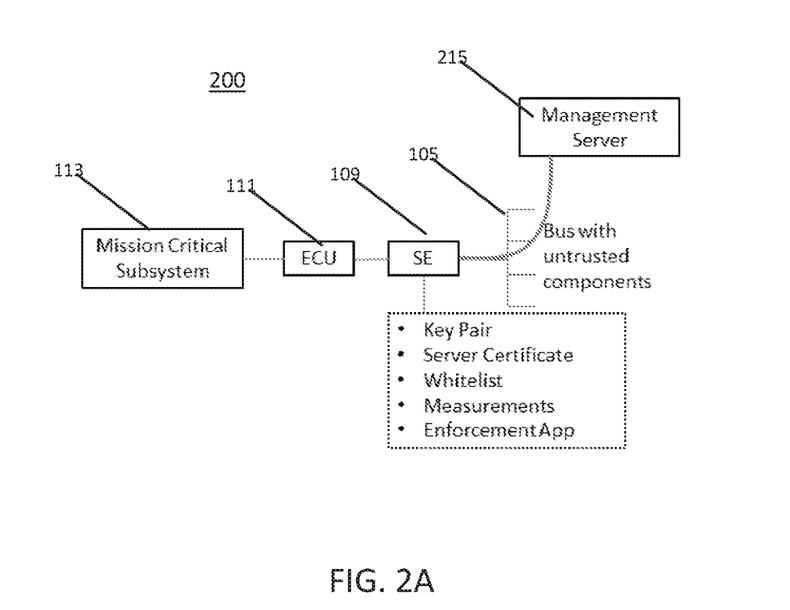
FIGS. 2A to 2C illustrate architectural diagrams according to various embodiments of the present disclosure.
Figure 2B:
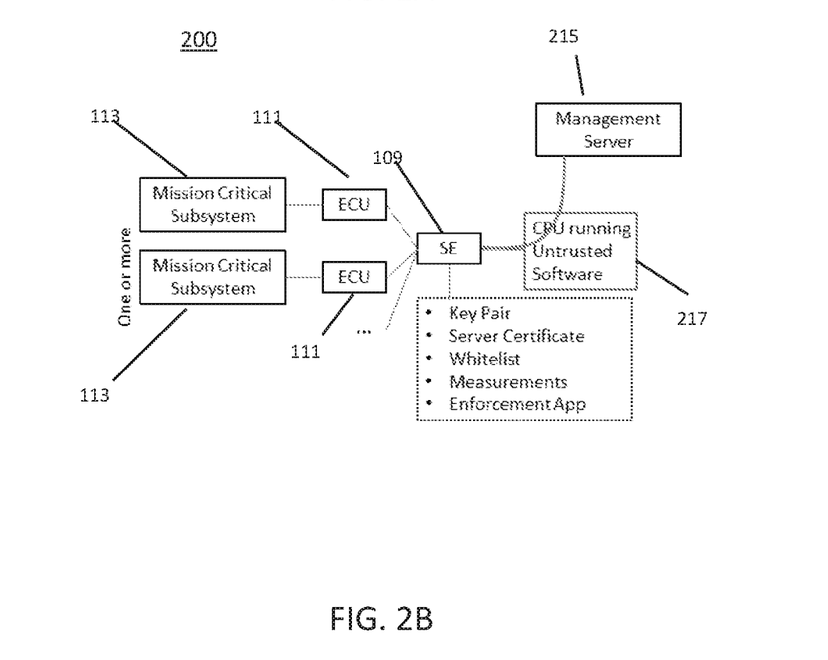
Figure 2C:
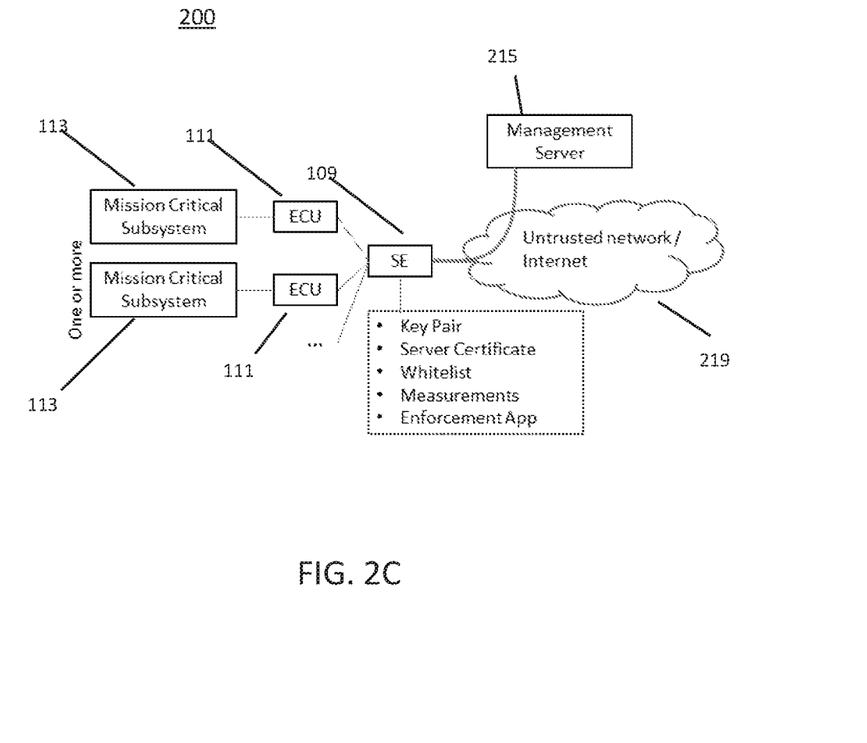

FIGS. 2A to 2C illustrate architectural diagrams according to various embodiments of the present disclosure.

Referring to FIGS. 2A to 2C, a system 200 for protection of mission critical components via a hardware-isolated secured elements includes a secure element 109, an electronic control unit 111, at least one mission critical subsystem 113 and a management server 215.

As discussed above, the electronic control unit 111 and the at least one mission critical subsystem 113 provide functionality of an embedded system, such as the OBD-II system 107 of FIG. 1, but is not limited thereto. For example, many home automation appliances and industrial devices use a controller area network to communicate with the electronic control unit 111 and the mission critical subsystem 113 found therein. Therefore, the application of the secure element 109 may be applied to may devices and environments.

While each of the architectures illustrated in FIGS. 2A to 2C are similar, it will be understood that in each architecture, the untrusted elements may be different. FIG. 2A presents a situation where the secure element 109 is placed between the electronic control unit 111 and an unsecure bus 105. FIG. 213 presents a situation where the secure element 109 is placed between the electronic control unit 111 and an untrusted CPU 217. FIG. 2C presents a situation where the secure element 109 is placed between the electronic control unit 111 and an untrusted network 219.

The secure element 109 protects the electronic control unit 111 and the at least one mission critical subsystem 113 by verifying the operations which the electronic control unit 111 will allow to be processed. For example, the electronic control unit 111 uses a public-private key pair for securing communication with outside devices. Further, the electronic control unit 111 uses a public-key (certificate) of the management server 215 to allow the management server 215 to provide administrative functions to the secure element 109. Such administrative functions may include, for example, updating whitelists and blacklists used by the secure element 109.

The secure element 109 also uses at least one of a whitelist of allowed electronic control unit 111 operations or a blacklist of forbidden electronic control unit 111 operations. The secure element 109 also uses a list of measurements of allowed electronic control unit 111 firmware to be loaded at boot-time of electronic control unit 111. The secure element 109 also uses an applet that enforces the whitelist/blacklist and the load-time measurements. Hereinafter the term bus is used to describe the transmission of operations over an unsecured path. It will be understood that any of elements 105, 217 and 219 may be such an unsecure path.

Figure 3:
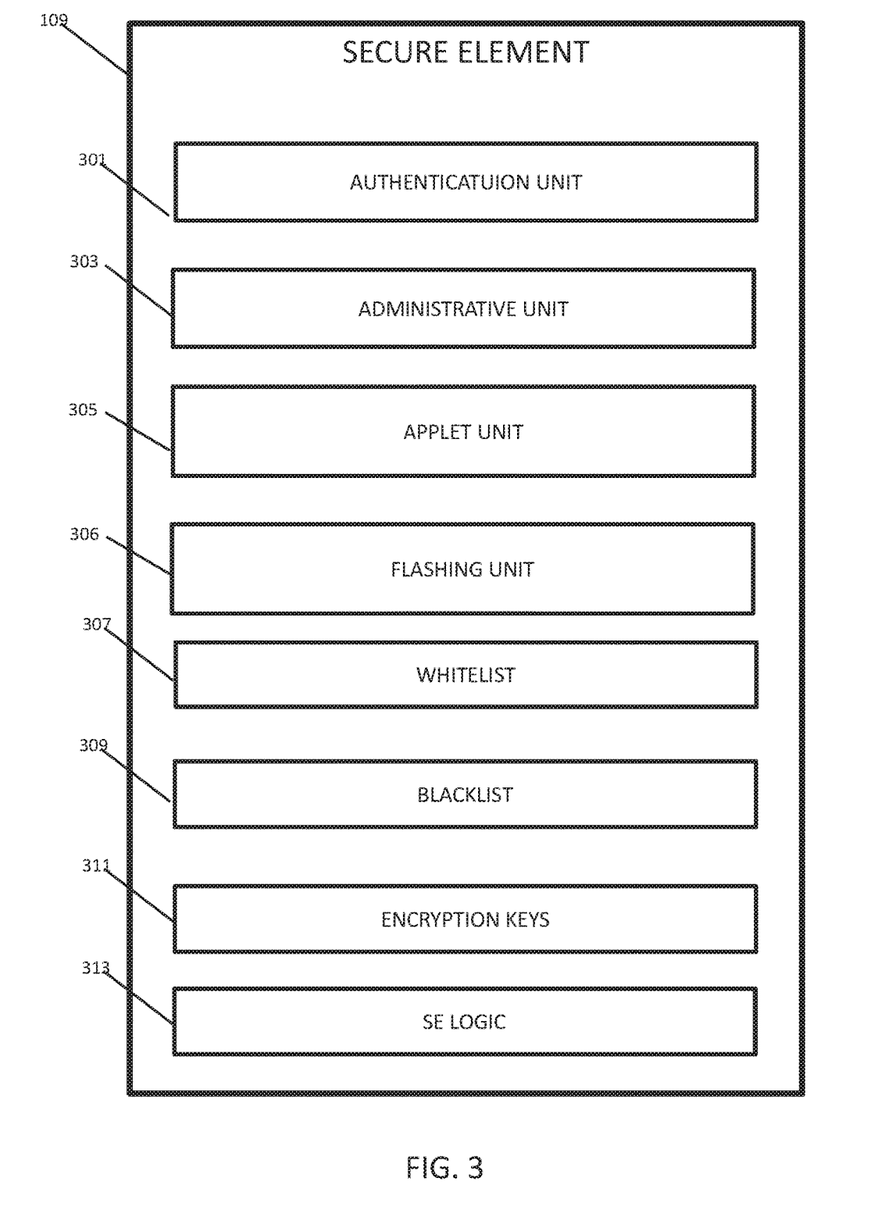
FIG. 3 illustrates a diagram of a secure element according to various embodiments of the present disclosure.

FIG. 3 illustrates a diagram of a secure element according to various embodiments of the present disclosure.

Referring to FIG. 3, a secure element 109 includes an authentication unit 301, an administrative unit 303, an applet unit 305, a flashing unit 306, a whitelist 307, a blacklist 309, encryption keys 311 and secure element logic 313.

The whitelist 307 is list of operations which the secure element 109 allows the electronic control unit 111 to execute. The blacklist 309 is list of operations which the secure element 109 prevents the electronic control unit 111 from executing. Both the whitelist 307 and blacklist 309 are produced by the management server 215 and encrypted (i.e., digitally signed) using a private key prior to being transmitted to the secure element 109. The encryption keys 311 are used for cryptographically verifying information transmitted by the management server 215 or untrusted devices, such as the attachment devices 101. The whitelist 307, the backlist 309 may be stored using a "trie" data structure, which is a tree for storing words with common prefixes.

The secure element logic 313 is software for when the secure element 109 is driven by a processor or tables of choices, or when the secure element 109 is driven by a hardware chipset.

The administrative unit 303 is responsible for installing and updating logic of the applet unit 305. Particularly, the administrative unit 303 verifies that new applet logic or applet data (i.e., the whitelist 307, the blacklist 309 or the secure element logic 313). The verification is performed by testing a digital signature of the data using a public half of the private key of the management server 215 that is stored in the encryption keys 311. Once the administrative unit 303 verifies that new applet logic or applet data is trusted, the data such as the whitelist 307, may be downloaded from the management server 215 and installed in the secure element 109. In this manner data which is transmitted across an unsecure bus 105 is verified as trusted.

The flashing unit 306 performs verification of firmware used by the electronic control unit 111. That is, when new firmware to be used by electronic control unit 111, the management server 215 encrypts (i.e., digitally signs) the firmware using a private key prior to transmission to the secure element 109. The verification is performed by testing the data using a public key of the management server 215 that is stored in the encryption keys 311. The public key of the management server 215 used by the flashing unit 306 is different than the public key of the management server 215 used by the administrative unit. In this manner data (i.e., firmware or execution image) which is transmitted across an unsecure bus 105 is verified as trusted.

The authentication unit 301 performs authentication of actuation operations. For example, an actuation operation is an operation that affects the state of a mission critical subsystem 113, is issued across the unsecure bus 105 for the electronic control unit 111, and intercepted by the secure element 109. The actuation operation is cryptographically signed by the management server 215 or other device. If the signature is not validated by the communication unit 301 using a public key of the encryption keys 111, then an error message is returned across the unsecure bus 105.

The applet unit 305 is responsible for enforcing a whitelist 307 or a blacklist 309 of diagnostic operations. A diagnostic operation is a read-only command issued across the unsecure bus 105 for execution by the electronic control unit 111 and the mission critical subsystem 113. A typical diagnostic operation in a vehicle, may be retrieving information of fuel efficiency (i.e., miles per gallon). A typical diagnostic operation in a smart home appliance may be retrieving the current temperature from a thermostat. Prior to execution of the diagnostic operation the applet unit 305 checks the operations against the whitelist 307, the backlist 309 or both lists (307 and 309). When the diagnostic operation is found in the whitelist 307, the diagnostic operation is forwarded to the electronic control unit 111 for processing the operation. When the diagnostic operation is not found in the whitelist 307, an error code is returned across the unsecure bus 105. Similarly, when the diagnostic operation is not found in the blacklist 309, the diagnostic operation is forwarded to the electronic control unit 111 for processing operation. When the diagnostic operation is found in the blacklist 307, an error code is returned across the unsecure bus 105.

Figure 4:
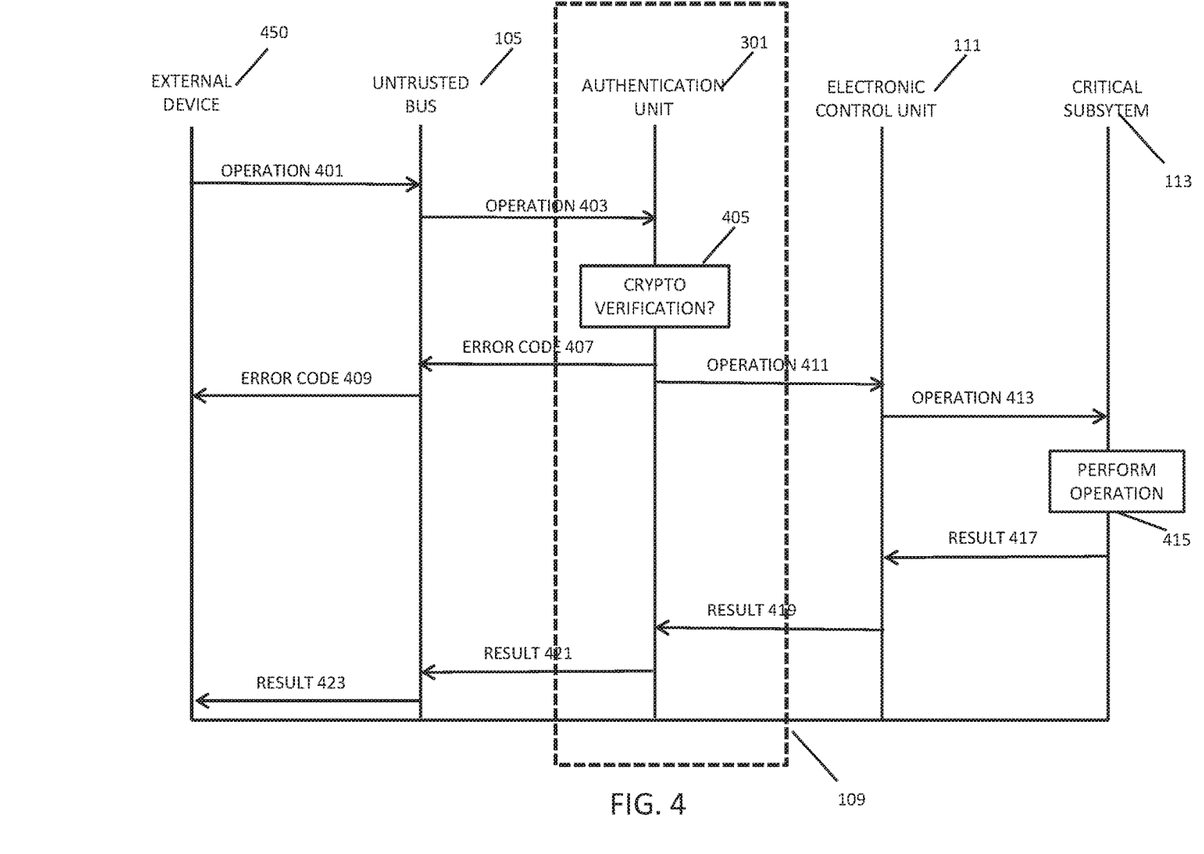
FIG. 4 illustrates a flow diagram of an authentication unit according to various embodiments of the present disclosure.

FIG. 4 illustrates a flow diagram of an authentication unit according to various embodiments of the present disclosure.

Referring to FIG. 4, in operation 401 an external device 450 transmits an actuation operation across the unsecure bus 105 for execution by the electronic control unit 111 and the mission critical subsystem 113. Because the unsecure bus 105 has untrusted components, the actuation operation may be altered or the external device 450 may be untrusted. In operation 403 the actuation operations continues transmission towards the electronic control unit 111.

The authentication unit 301 of the secure element 109, which is hardware isolated and interposed between the untrusted bus and the electronic control unit 111, intercepts the actuation operation. The authentication unit 301 determines that the operation is an actuation operation and cryptographically verifies the operation using a public key found in the encryptions keys 311 in operation 405.

If the authentication unit 301 determines that the actuation operation is not cryptographically verifiable, then the authentication unit 301 returns an error code in operation 407 which is retransmitted across the unsecure bus 105 in operation 409.

If the authentication unit 301 determines that the actuation operation is cryptographically verifiable, then the authentication unit 301 transmits the actuation operation to the electronic control unit 111 in operation 411. The electronic control unit 111 transmits the actuation operation to the mission critical subsystem 113 in operation 413. In operation 415, the mission critical subsystem 113 performs the operation. In operations 417, 419, 421 and 423 the result of performing the actuation operation is transmitted towards the external device 450.

Figure 5:
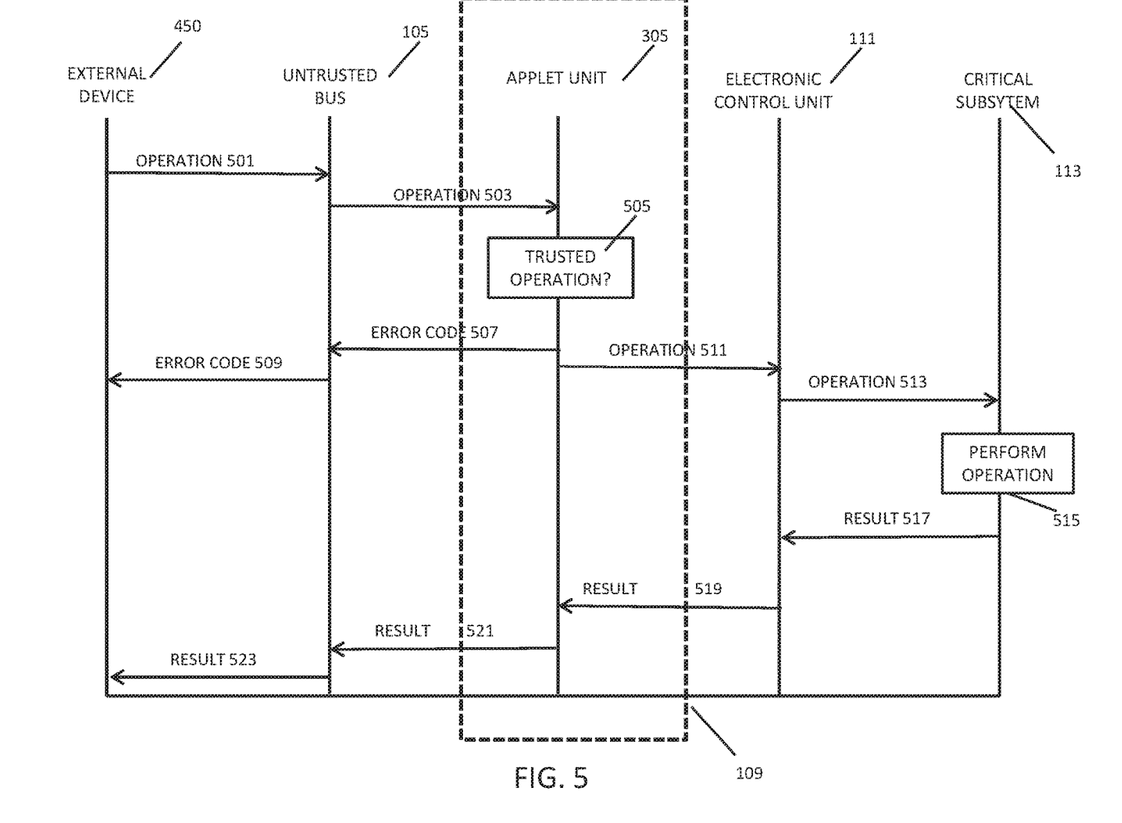
FIG. 5 illustrates a flow diagram of an applet unit according to various embodiments of the present disclosure.

FIG. 5 illustrates a flow diagram of an applet unit according to various embodiments of the present disclosure.

Referring to FIG. 5, in operations 501 the external device 450 transmits a diagnostic operation across the unsecure bus 105 for execution by the electronic control unit 111 and the mission critical subsystem 113. Because the unsecure bus 105 has untrusted components attached thereto, the diagnostic operation may be altered or the external device 450 may be untrusted. In operation 503 the diagnostic operation continues transmission towards the electronic control unit 111.

The applet unit 305 of the secure element 109, which is hardware isolated and interposed between the untrusted bus and the electronic control unit 111, intercepts the diagnostic operation. The applet unit 305 determines whether the diagnostic operation is trusted by matching the operations to either the whitelist 307 or the blacklist 309 in operation 505.

If the applet unit 305 determines that the diagnostic operation is not trusted, then the applet unit 305 returns an error code in operation 507 which is retransmitted across the unsecure bus 105 in operation 509.

If the applet unit 305 determines that the diagnostic operation is trusted, then the applet unit 305 transmits the diagnostic operation to the electronic control unit 111 in operation 511. The electronic control unit 111 transmits the diagnostic operation to the mission critical subsystem 113 in operation 511 operation 515, the mission critical subsystem 113 performs the operation. In operations 517, 519, 521 and 523 the result of performing the diagnostic operation is transmitted towards the external device 450.

It will be understood by those of ordinary skill in the art while the applet unit 305 filters out diagnostic operations and the authentication unit 301 filters out cryptographically unverifiable actuation operations, each of the application unit 305 and the authentication unit 301 may work on both actuation operations and diagnostic operations.

Figure 6:
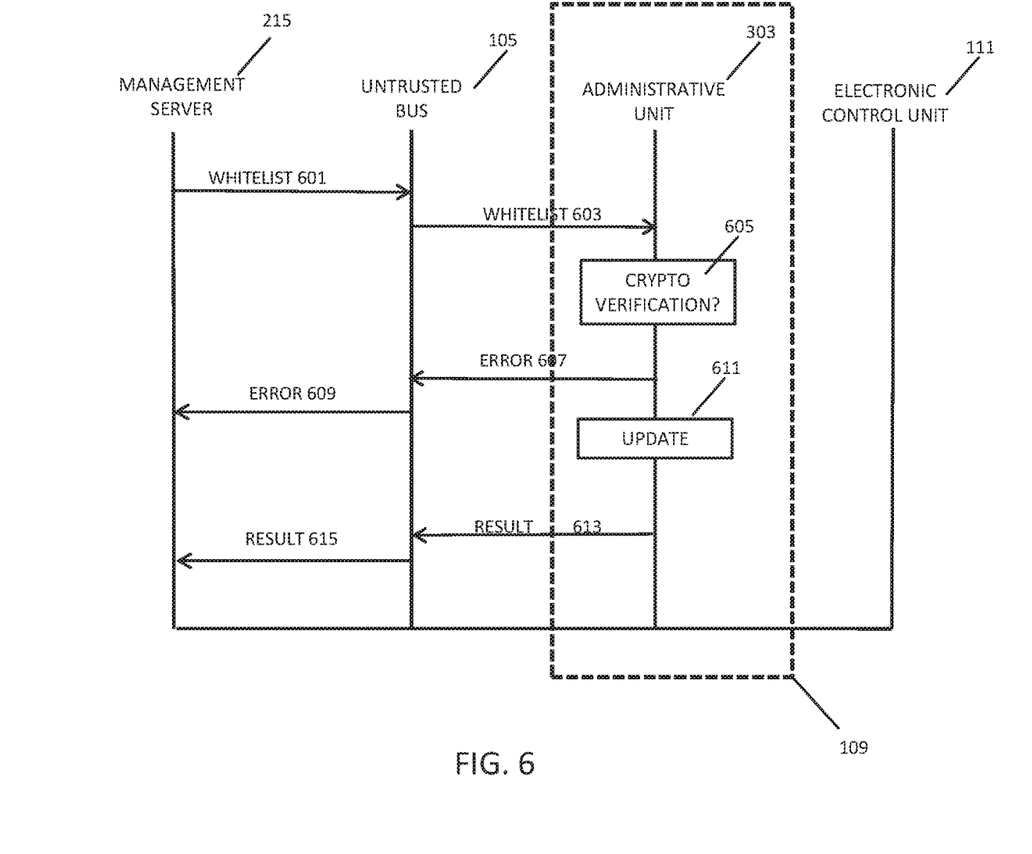
FIG. 6 illustrates a flow diagram of an administrative unit according to various embodiments of the present disclosure.

FIG. 6 illustrates a flow diagram of an administrative unit according to various embodiments of the present disclosure.

Referring to FIG. 6, in operation 601 the management server 215 transmits an updated whitelist, an updated backlist or secure element logic 313 to the secure element 109. The update to the whitelist 307, the backlist 309 or the secure element logic 313 crosses the unsecure bus 105 in operation 603. The administrative unit 303 receives the update of, for example, the whitelist 307. In operation 605 the updated whitelist is cryptographically verified by the administrative unit 303 using a private key of the management server 215 found in the encryption keys 311.

If the update to the whitelist 307 cannot be cryptographically verified in operation 605, an error is returned to the management server 215 by the administrative unit 303 across the unsecure bus 105 in operations 607 and 609.

If the update to the whitelist 307 is cryptographically verified in operation 605, then the administrative unit 303 stores the updated whitelist in the whitelist 307 in operation 611. Likewise, cryptographically verified updated blacklist and updated secure element logic are stored in the blacklist 309 and secure element logic 313 respectively.

In operations 613 and 615 a result of the update is returned across the unsecure bus 105 to the management server 215.

Figure 7:
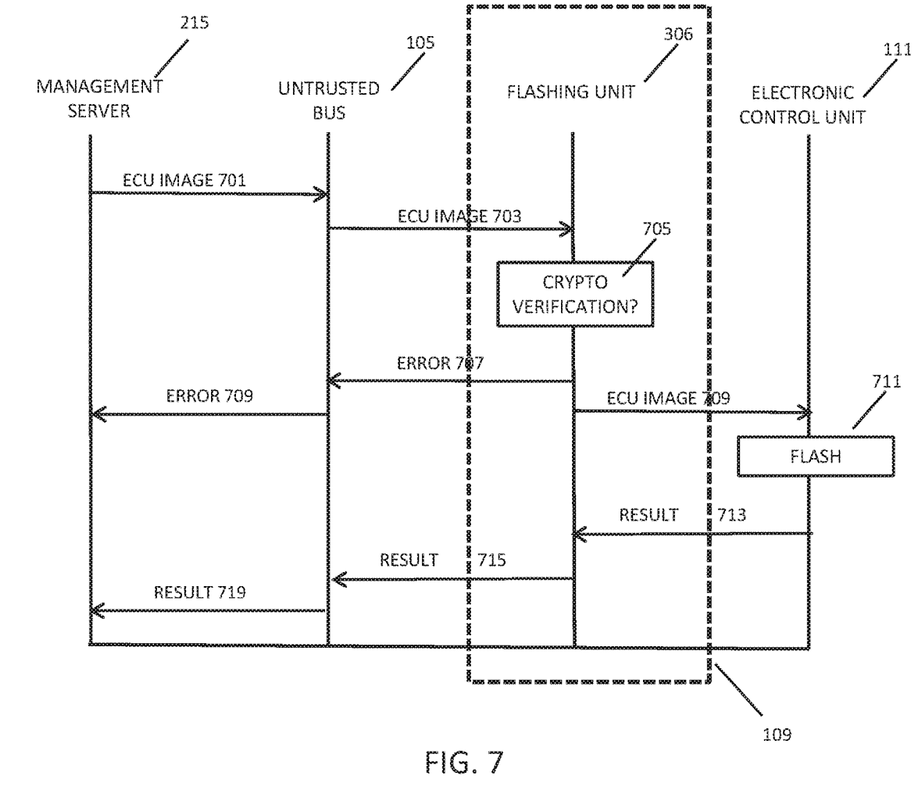
FIG. 7 illustrates a flow diagram of a flashing unit according to various embodiments of the present disclosure.

FIG. 7 illustrates a flow diagram of a flashing unit according to various embodiments of the present disclosure.

Referring to FIG. 7, the management server 215 transmit an update to software (i.e., ECU image) to be installed on the electronic control unit 111 across the untrusted bus in operations 701 and 703.

In operation 705 the ECU image is cryptographically verified by the flashing unit 306 using a private key of the management server 215 found in the encryption keys 311.

If the update to the ECU image cannot be cryptographically verified in operation 705, an error is returned to the management server 215 by the flashing unit 306 across the unsecure bus 105 in operations 707 and 709.

If the update to the ECU image is cryptographically verified in operation 705, then the flashing unit 306 forwards the update to the ECU image to the electronic control unit 111 where it is stored in operation 711 in an eeprom or a flash memory for later execution by the electronic control unit 111.

In operations 713, 715 and 719 a result of the flashing is returned across the unsecure bus 105 to the management server 215.

Figure 8:
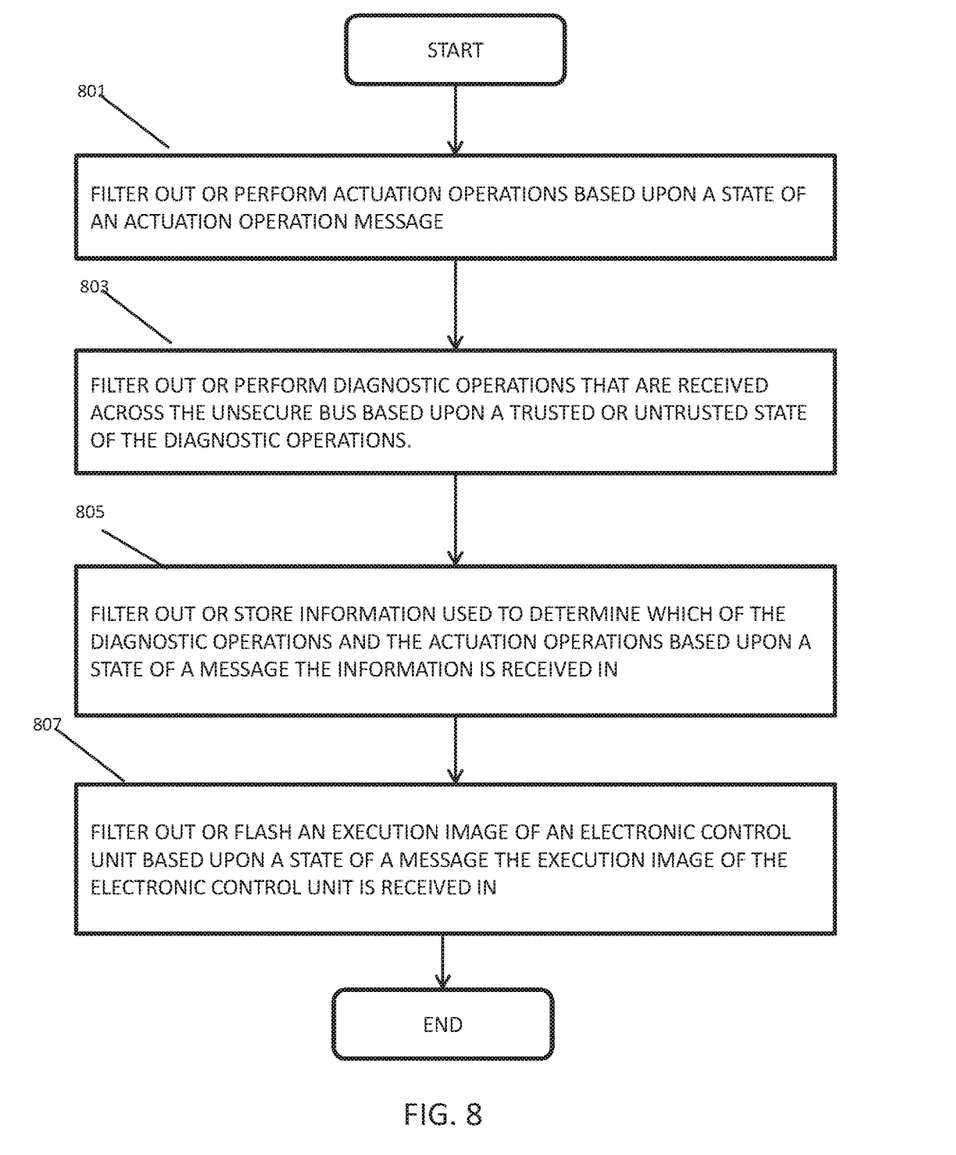
FIG. 8 is a flow chart illustrating processing of a secure element according to various embodiments of the present disclosure.

FIG. 8 is a flow chart illustrating processing of a secure element according to various embodiments of the present disclosure.

Referring to FIG. 8, operation 801 filters out or performs actuation operations that are received across an unsecure bus that modify the state of at least one of the plurality of mission critical subsystems based upon a state of a message the actuation operations are received in.

Operation 803 filters out or perform diagnostic operations that are received across the unsecure bus that request state information of the at least one of the plurality of mission critical subsystems based upon a trusted or untrusted state of the diagnostic operations.

Operation 805 filters out or stores information used to determine which of the diagnostic operations and the actuation operations received across the unsecure bus are filtered out or performed based upon a state of a message the information is received in.

Operation 807 filter outs or flashes an execution image of an electronic control unit when the execution image of the electronic control unit is received across the unsecure bus based upon a state of a message the execution image of the electronic control unit is received in.

Figure 9:
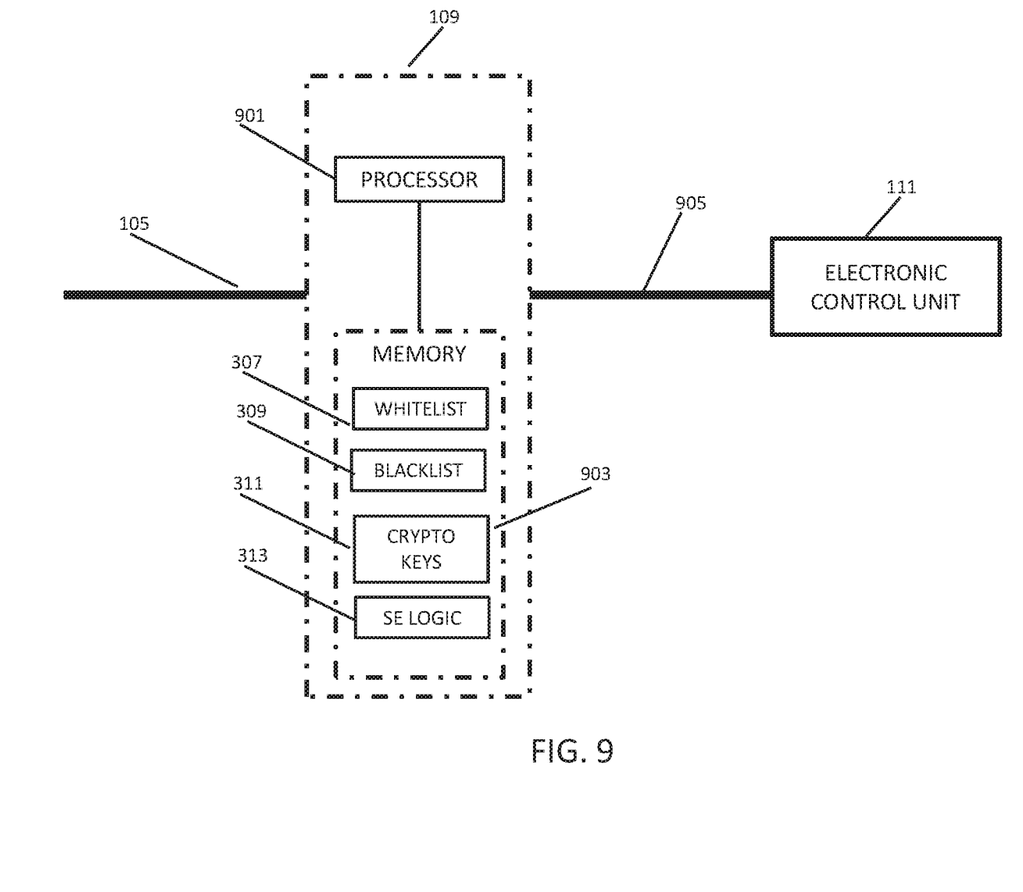
FIG. 9 is a diagram illustrating components of a secure element according to various embodiments of the present disclosure.

FIG. 9 is a diagram illustrating components of a secure element according to various embodiments of the present disclosure.

Referring to FIG. 9, the secure element 109 includes a processor 901 and a memory 903. The secure element 109 is a hardware unit which isolates the electronic control unit 111 from the unsecure bus 105. The secure element 109 communicates with the electronic control unit across a secure bus 905.

The processor 901 performs the functions of the authentication unit 301, the administration unit 303, the applet unit 305 and the flashing unit 306. Alternatively the processor 901 may be replaced by a chipset which performs the same functions in hardware.

The memory 903 includes the whitelist 307, blacklist 309, encryption keys 311 and secure element logic 313. The combination processor 901 and memory 903 allow the secure element 109 to filter out nefarious operations and protect both secure element logic 313 and the electronic control unit 111 from malicious attack.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing an apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A secure element for providing hardware isolation of a mission critical subsystem, the system comprising:
a memory; and
a processor coupled to the memory and an unsecure path, the processor configured to:
  secure an operation received across the unsecure path, the operation controlling, modifying or requesting a state or configuration of at least one of the mission critical subsystem or an electronic control unit by at least one of a plurality of verification mechanisms, and
  secure an operation initiated by at least one of the mission critical subsystem or the electronic control unit across a secure path,
wherein the secure element is coupled between the electronic control unit along a controller area network (CAN) bus and secures the operation received on the unsecure path comprising at least one of:
  modifying the state of the mission critical subsystem based upon an actuation operation;
  requesting state information of the mission critical subsystem based upon a diagnostic operation;
  storing information used to determine which of the diagnostic operation and the actuation operation are performed; or
  flashing an execution image of the electronic control unit when the execution image of the electronic control unit is received,
wherein the processor is further configured to return a result received from the mission critical subsystem or the electronic control unit without verification in response to the operation triggering the result, and
wherein the operation triggering the result is cryptographically verified when received across the unsecure path.

2. The secure element of claim 1, wherein the modifying of the state of the mission critical subsystem based upon the actuation operation comprises:
perform the cryptographic verification by cryptographically verifying that the actuation operation was not tampered with during transmission or transmitted from an untrusted device,
allowing performance of the actuation operation via the electronic control unit and the mission critical subsystem upon cryptographically verifying the actuation operation was not tampered with during transmission and not transmitted by the untrusted device, and
filter out the actuation operation and return an error code upon cryptographically verifying the actuation operation was tampered with during transmission or transmitted by the untrusted device.

3. The secure element of claim 2, wherein the cryptographically verifying is performed using a public key/private key pair.

4. The secure element of claim 1, wherein the processor is further configured, when requesting the diagnostic information based upon the diagnostic operation, to:
determine if the diagnostic operation is a trusted operation in the mission critical subsystem,
perform the diagnostic operation via the electronic control unit and mission critical subsystem upon determination the diagnostic operation is trusted, and filter out the diagnostic operation and return an error code upon determination the diagnostic operation is not trusted.

5. The secure element of claim 4, wherein the determination that the diagnostic operation is a trusted operation is made by comparing the diagnostic operation to at least one of a whitelist or a blacklist.

6. The secure element of claim 1, wherein the storing of the information further comprises:
receive at least one of a whitelist, a black list or secure element logic a cross the unsecure path,
perform the cryptographic verification by cryptographically verifying the at least one of the whitelist, the black list or the secure element logic was not tampered with during transmission or transmitted from an untrusted device,
store the at least one of the whitelist, the black list or the secure element logic for use by the secure element upon determination the at least one of the whitelist, the black list or the secure element logic was not tampered with during transmission or not transmitted from the untrusted device, and
transmit an error code back across the unsecure path upon determination the at least one of the whitelist, the black list or the secure element logic was tampered with during transmission or transmitted from the untrusted device.

7. The secure element of claim 6, wherein the cryptographic verification is performed using a public key of a trusted device.

8. The secure element of claim 1, wherein the flashing of the execution image comprises:
perform the cryptographic verification by cryptographically verifying that the execution image was not tampered with during transmission or transmitted from an untrusted device,
transmit the execution image to the electronic control unit for flashing upon determination the execution image was not tampered with during transmission or not transmitted from the untrusted device, and
transmit an error code back across the unsecure path upon determination the execution image was tampered with during transmission or transmitted from the untrusted device.

9. The secure element of claim 8, wherein the cryptographic verification is performed using a public key of a trusted device.

10. A method in a hardware isolated secure element for protecting a mission critical subsystem, the method comprising:
receiving an operation across an unsecure path;
securing the operation controlling, modifying or requesting a state or configuration of at least one of the mission critical subsystem or an electronic control unit by at least one of a plurality of verification mechanisms; and
securing an operation initiated by at least one of the mission critical subsystem or the electronic control unit across a secure path,
wherein the hardware isolated secure element is coupled between the electronic control unit (ECU) along a controller area network (CAN) bus and securing the operation received on the unsecure path,
wherein the operation comprises at least one of:
modifying the state of the mission critical subsystem based upon an actuation operation;
requesting state information of the mission critical subsystem based upon a diagnostic operation;
storing information used to determine which of the diagnostic operation and the actuation operation are performed; or
flashing an execution image of the electronic control unit when the execution image of the electronic control unit is received,
wherein the method further comprises returning a result received from the mission critical subsystem or the electronic control unit without verification in response to the operation triggering the result, and
wherein the operation triggering the result is cryptographically verified when received across the unsecure path.

11. The method of claim 10, wherein, the modifying of the state of the mission critical subsystem based upon the actuation operation further comprises:
perform the cryptographic verification by cryptographically verifying that the actuation operation was not tampered with during transmission or transmitted from an untrusted device;
performing the actuation operation via the electronic control unit and the mission critical subsystem upon determination the actuation operation was not tampered with during transmission and not transmitted by the untrusted device; and
filtering out the actuation operation and returning an error code upon determination the actuation operation was tampered with during transmission or transmitted by the untrusted device.

12. The method of claim 11, wherein the cryptographic verification is performed using a public key/private key pair.

13. The method of claim 10, wherein the requesting of the diagnostic information based upon the diagnostic operation further comprises:
determining that the diagnostic operation is a trusted operation in the mission critical subsystem;
performing the diagnostic operation via the electronic control unit and the mission critical subsystem upon determination the diagnostic operation is trusted; and
filtering out the diagnostic operation and returning an error code upon determination that the diagnostic operation is not trusted.

14. The method of claim 13, wherein the determination that the diagnostic operation is a trusted operation is made by comparing the diagnostic operation to at least one of a whitelist or a blacklist.

15. The method of claim 10, wherein the storing of the information further comprises:
receiving at least one of a whitelist, a black list or secure element logic across the unsecure path;
perform the cryptographic verification by cryptographically verifying that the at least one of the whitelist, the black list or the secure element logic was not tampered with during transmission or transmitted from an untrusted device;
storing the at least one of the whitelist, the black list or the secure element logic for use by the secure element upon determination the at least one of the whitelist, the black list or the secure element logic was not tampered with during transmission or not transmitted from the untrusted device; and
transmitting an error code back across the unsecure path upon determination the at least one of the whitelist, the black list or the secure element logic was tampered with during transmission or transmitted from the untrusted device.

16. The method of claim 15, wherein the cryptographic verification is performed using a public key of a trusted device.

17. The method of claim 10, wherein the flashing of the execution image of the electronic control unit, further comprises:
- perform the cryptographic verification by cryptographically verifying that the execution image was not tampered with during transmission or transmitted from an untrusted device;
- transmitting the execution image to the electronic control unit for flashing upon determination the execution image was not tampered with during transmission or not transmitted from the untrusted device; and
- transmitting an error code back across the unsecure path upon determination the execution image was tampered with during transmission or transmitted from the untrusted device.

18. The method of claim 17, wherein the cryptographic verification is performed using a public key of a trusted device.

* * * * *